United States Patent [19]

Scott

[11] 4,186,654
[45] Feb. 5, 1980

[54] RECIRCULATING LUBRICATION SYSTEM
[75] Inventor: David G. Scott, Duncan, Okla.
[73] Assignee: Halliburton Company, Duncan, Okla.
[21] Appl. No.: 906,899
[22] Filed: May 18, 1978
[51] Int. Cl.² ............................................. F01B 31/00
[52] U.S. Cl. ...................................... 92/78; 92/86.5; 92/156; 184/18
[58] Field of Search ............... 184/6.24, 6, 6.21, 6.28, 184/18; 92/86.5, 156, 78

[56] References Cited
U.S. PATENT DOCUMENTS

| | | | |
|---|---|---|---|
| 763,681 | 6/1904 | Lefebvre | 184/6.24 |
| 1,207,067 | 12/1916 | Nugent | 184/6.24 X |
| 1,227,481 | 5/1917 | Morris | 184/6.24 |
| 1,768,139 | 6/1930 | Nugent | 184/6.24 |
| 1,781,803 | 11/1930 | Bizzarri | 92/86.5 |
| 2,268,653 | 1/1942 | Flowers | 184/6.24 X |
| 2,422,498 | 6/1947 | Perlman | 184/6.24 |
| 2,441,681 | 5/1948 | Werder | 184/6.24 |

FOREIGN PATENT DOCUMENTS 988366  5/1976  Canada ..................... 92/86.5

*Primary Examiner*—David H. Brown
*Attorney, Agent, or Firm*—James R. Duzan; John H. Tregoning

[57] ABSTRACT

Improved lubrication system for multiplex pumps including lubrication reservoir means, pump means, filtration means and valve means.

2 Claims, 2 Drawing Figures

RECIRCULATING LUBRICATION SYSTEM

This invention relates to a recirculating lubrication system for a multiplex pump. More specifically, this invention relates to a recirculating lubrication system for a hydraulically powered multiplex pump.

In the oil industry it has become common to utilize multiplex pumps designed to deliver pumped fluid at high pressures on the order of 15,000 psi or greater. A typical multiplex pump comprises a hydraulically powered triplex pump having at least three pumping units each operable in a cycle including suction, precompression and discharge phases, with the cycles of each unit being out of phase with one another. Each pumping unit is fluid operated by power fluid acting on a piston rod assembly extending between the fluid end a power cylinder assembly at the power end of that unit.

The fluid end and power cylinder assembly of each unit are separated by a spacer frame assembly which permits the fluid end piston rod and the power end piston rod to be separate members thereby facilitating maintenance operations. The fluid end piston rod and power end piston rod of each unit are each hollow, cylindrical members sealingly engaged by suitable seal means in the fluid end and the power end respectively. If desired, a floating annular rod seal may be employed on each power end cylinder unit to allow the power end piston rod to operate slightly eccentric to the power cylinder bores, thereby eliminating the necessity of extremely accurate alignment between each power end cylinder unit and its corresponding fluid end cylinder unit.

Typical prior art hydraulically powered multiplex pumps as discussed hereinbefore are described in U.S. Pat. Nos. 3,650,638; 3,662,652; 3,765,449 and 3,847,511.

In the prior art, the seal means installed in each fluid end unit to sealingly engage the fluid end piston rod associated with each fluid end unit is continuously lubricated to provide a low friction surface between the seal means and fluid end piston rod, to provide cooling of the seal means to prevent rapid deterioration thereof during operation and to provide a means of washing the surface of the fluid end piston rod to remove any abrasive materials therefrom during operation which would cause deterioration of either the seal means or the fluid end piston rod. Prior art fluid end seal lubrication systems for multiplex type pumps have comprised a gas pressurized oil reservoir and the necessary oil lines running to each fluid end seal means to allow the oil to flow into and out of the seal means. Upon exiting the seal means of each fluid end unit, since the oil was contaminated by the materials being pumped by the multiplex pump, the oil was merely dumped into either any suitable container or onto the earth and disposed of after the pumping operation had been completed. While this resulted in a simple lubrication system for the seal means in the fluid end unit, during lengthy pumping operations large amounts of lubricating oil were consumed by the multiplex pump resulting in oil supply problems since it was necessary to refill the gas pressurized oil reservoir and resulting in increased operating costs since the lubricating oil could not be reused.

In contrast to the prior art lubrication systems for multiplex pumps, the present invention allows the lubricating oil to be cleaned and recycled during the operation of the pumping unit thereby eliminating the problem of resupply of lubricating oil and lowering of the operational cost of the pump since the oil is recycled rather than being disposed of after a single use. The present invention comprises an improved lubrication system for multiplex pumps including an oil reservoir means, pump means, filtration means and the necessary piping and valving means to interconnect the improved lubrication system with the seal means associated with each fluid end unit.

The foregoing advatages and the preferred embodiments of the invention will be better understood from the following specification taken in conjunction with the accompanying drawings wherein.

Figure 1:
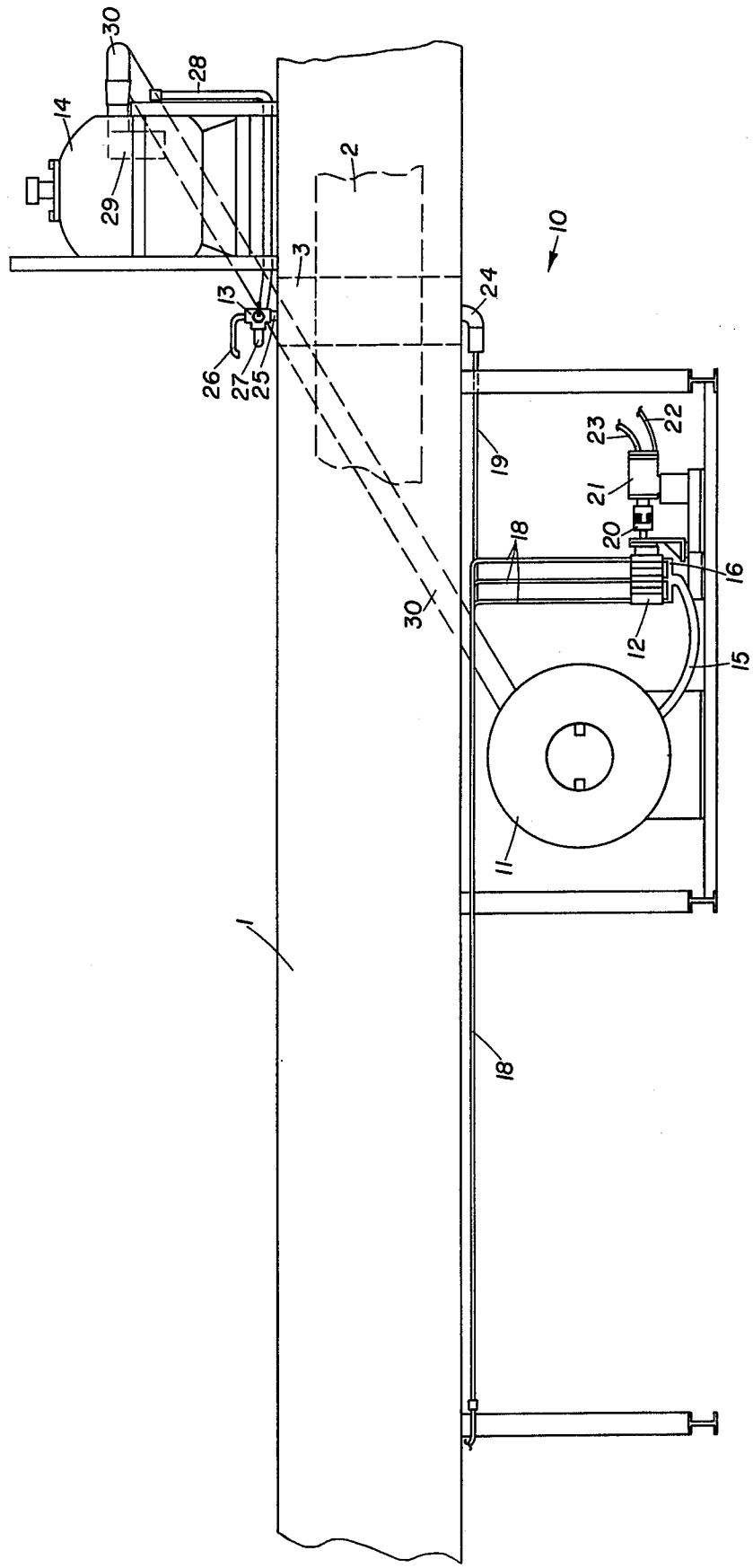
FIG. 1 is a side view of the present invention installed in a multiplex pump.

Referring to FIG. 1, the present invention is shown in its preferred embodiment. The recirculating lubrication system 10 is shown installed in a multiplex pump having a frame 1, fluid end piston rod 2 (shown in phantom) and seal means packing gland 3 (shown in phantom) sealingly engaging the fluid end piston rod 2.

The recirculating lubrication system 10 comprises lubrication reservoir means 11, pump means 12, valve means 13 and filtration means 14.

The lubrication reservoir means 11 comprises a suitable tank which is interconnected with the pump means 12 via line 15.

The pump means 12 has an inlet manifold 16 connected to line 15 to supply and distribute the lubricant to be circulated which is stored in lubricant reservoir means 11. The pump means 12 comprises any suitable positive displacement type pump, although a three section gear pump, Model OH5BS/OH5B/OH5B-RB, as manufactured and sold by Webster Electric Company, Inc. of Racine, Wis. which provides a positive supply of lubricant to each seal means packing gland 3 of the pump is preferred.

On the outlet side, each section of the pump means 12 is connected by means of a discharge line 17 (not shown in FIG. 1) to piston rod and packing gland lubrication lines 18 and 19.

Lubrication lines 18 supply a small volume of lubricant to the power end piston rod (not shown) which lubricant is not recirculated through the lubrication system 10 while lubrication lines 19 supply lubricant to the seal means packing glands 3 of the pump which lubricant is recirculated therethrough.

The pump means 12 is driven through any suitable type flexible coupling means 20 of any suitable fluid motor 21 which is connected to a suitable source of fluid pressure by means of lines 22 and 23. It should be noted that the pump could be driven by any rotary power device.

Each seal means packing gland 3 of the pump is connected at the inlet thereof to its respective lubrication supply line 19 by means of connector 24. After the lubricant has flowed through the seal means packing gland 3 it exits therefrom via line 25 which is connected to the inlet of valve means 13. The valve means 13 installed on each seal means packing gland 3 may be any suitable type three-way two-position valve. By slecting the appropriate operating position for the valve means 13 the lubricant exiting from each seal means packing gland 3 may flow either through outlet line 26 to be dripped on power end piston rod 2 during the operation thereof or through outlet manifold 27.

The outlet manifold 27 is connected by means of line 28 to the filtration means 14.

The filtration means 14 comprises a tank of sufficient volume to allow the lubricant being pumped thereinto several minutes of residence time therein before exiting therefrom through filter means 29 which is connected to return line 30 which, in turn, is connected to lubricant reservoir means 11. The filter means 29 of the filtration means 14 may be of any suitable type which is capable of separating abrasive materials from the lubricant, although a suction strainer having 60 mesh size openings therein as manufactured and sold by Michigan Fluid Power of Wheeling, Ill. is the preferred type of filter means. The filtraton means 14 further includes a drain line 31 (not shown) connected to the bottom thereof and control valve means 32 (not shown) to drain contaminants from the filtration means 14 during pumping operations.

Figure 2:
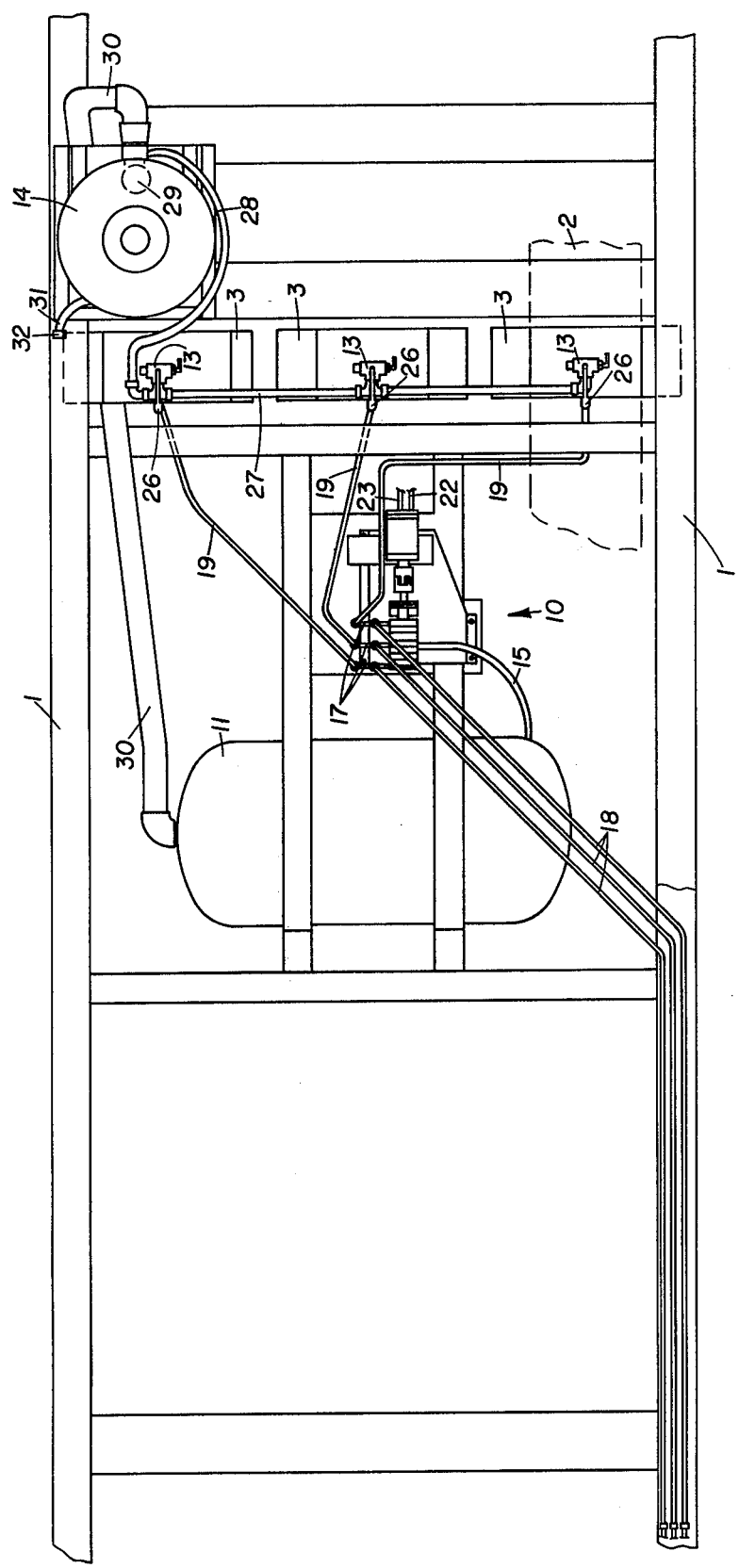
FIG. 2 is a top view of the present invention installed in a multiplex pump.

Referring to FIG. 2, the lubrication system 10 is shown in top view.

As can be clearly seen, each section of the pump means 12 has a discharge line 17 connected thereto which, in turn, has piston rod and seal means packing gland 3, lubrication lines 18 and 19 connected thereto. As shown, each seal means packing gland 3 has a lubrication line 19 connected thereto.

Further shown, in FIG. 2 is the drain line 31 and control valve means 32 attached thereto to use to drain contaminants from the filtration means 14 during pumping operations.

During operation of the multiplex pump lubricant is drawn from lubricant reservoir means 11 by pump means 12 and pumped therefrom through lubrication lines 18 which supply a small amount of lubricant to the power end piston rods and through lubrication lines 19 which supply lubricant to the seal means packing glands 3 to lubricate the fluid end piston rods 2, to cool the seal means contained within the seal means packing gland 3 and to wash contaminants from the fluid end piston rods 2 to help prevent deterioration of either the seal means or the power end piston rod. The lubricant exits each seal means packing gland 3 via line 25 which is connected to the inlet of valve means 13.

Normally, the valve means 13 is operably positioned to cause the contaminated lubricant to flow into outlet manifold 27. From outlet manifold 27 the contaminated lubricant flows via line 28 into filtration means 14 wherein the lubricant is allowed to remain for several minutes undisturbed to allow the solid contaminants and any higher specific gravity liquids to separate therefrom and settle to the bottom of the filtration means 14. Subsequently, lubricant in the filtration means 14 is removed therefrom by flowing through filter 29, which filters out other contaminants, into line 30 which returns the oil to the lubricant reservoir means 11.

If the filtration means 14 contains large quantities of solid and liquid contaminants therein during pumping operations, before the level of contaminants reach the level of filter 29 therein, they should be drained therefrom by opening control valve means 32 on line 31. When uncontaminated lubricant flows out control valve means 32, the control valve means is closed until it becomes necessary to drain the filtration means 14 again. The level of solid and liquid contaminants within the filtration means 14 may be ascertained at any time during the pumping operations by installing a visual sight glass indicator on the filtration means 14.

If the filtration means 14 requires frequent draining of the contaminants therefrom, it usually indicates that one or more of the seal means retained within seal means packing gland 3 of the multiplex pump is badly deteriorated and is allowing contaminants to freely enter the lubricant. During pumping operations, to easily discover which seal means is deteriorated it is only necessary to alternately open three-way two-position valve means 13 on each seal means packing gland 3 to cause lubricant to flow out outlet line 26 and onto power end piston rod 2. It will be readily apparent from a visual examination of the lubricant flowing from the seal means packing gland 3 as to whether or not the seal means located therein is badly deteriorated thereby allowing contaminants to flow into the lubricant. After a visual inspection of the lubricant flowing from the outlet line 26, the valve means 13 is returned to its original position to cause the lubricant to flow into outlet manifold 27 and resume circulation through the lubricating system 10.

It should be readily apparent from the foregoing that the present invention may be adapted to any type multiplex pump, including a multiplex pump of the type having a mechanical type of power supply rather than fluid type power supply. If the present invention is utilized on a multiplex pump having a mechanical type of power supply, the lubrication lines which run to the power end of the pump may be eliminated.

Having thus described my invention, I claim:

1. An improved lubrication system for the seal means retained within the packing gland of the fluid end of a multiplex pump having reciprocating piston means therein sealingly engaged by said seal means, said improved lubrication system having lubricant reservoir means containing lubricant therein, wherein the improvement in said lubrication system comprises:

positive displacement pump means connected to said lubricant reservoir means supplying said lubricant to said seal means;

filtration means filtering contaminants from said lubricant after exiting from said seal means but before the return thereof to said lubricant reservoir means; and three-way two-position valve means to direct the flow of said lubricant from said seal means, said three-way two-position valve means operable between a first position directing the flow of said lubricant fluid flow from said seal means through said three-way two-position valve means to said filtration means and a second position directing the flow of said lubricant from said seal means through said three-way two-position valve means onto said piston means.

2. An improved lubrication system for the seal means retained within the packing gland of the fluid end of a multiplex pump having reciprocating piston means therein driven by piston means of the power end of said multiplex pump, said improved lubrication system having lubricant reservoir means containing lubricant therein, wherein the improvement in said lubrication system comprises:

positive displacement pump means connected to said lubricant reservoir means supplying said lubricant to said seal means and the piston means of said fluid end;

filtration means filtering contaminants from said lubricant exiting said seal means before the return of said lubricant to said reservoir means; and three-way two-position valve means directing the flow of lubricant from said seal means, said three-way two-position valve means operable between a first position directing the flow of said lubricant from said seal means through said three-way two-position valve means to said filtration means and a second position directing the flow of said lubricant from said seal means through said three-way two-position valve means onto said piston means of said fluid end.

* * * * *